United States Patent [19]

Nathansohn et al.

[11] 3,882,119

[45] May 6, 1975

[54] TETRACYCLIC SUBSTITUTED PHTHALAZINE COMPOUNDS

[75] Inventors: Giangiacomo Nathansohn, Milan; Elvio Bellasio, Albate, (Como), both of Italy

[73] Assignee: Gruppo Lepetit S.p.A., Milan, Italy

[22] Filed: Oct. 15, 1973

[21] Appl. No.: 406,730

Related U.S. Application Data

[63] Continuation-in-part of Ser. No. 96,625, Dec. 9, 1970, abandoned.

[30] Foreign Application Priority Data

Jan. 27, 1970 Italy.................................. 19810/70

[52] U.S. Cl. ..... 260/250 P; 260/295 R; 260/295 K; 260/544 M; 424/250
[51] Int. Cl....................... C07d 51/06; C07d 57/02
[58] Field of Search................................ 260/250 P

[56] References Cited
UNITED STATES PATENTS 3,709,886  1/1973  Nathansohn..................... 260/250 P

FOREIGN PATENTS OR APPLICATIONS 7,100,542  7/1971  Netherlands................... 260/250 P

OTHER PUBLICATIONS

Nathansohn et al., Chemical Abstract 75: 151821t of Ger. Offen. 2,103,134, Aug. 19, 1971.

*Primary Examiner*—Alton D. Rollins
*Assistant Examiner*—Ralph D. McCloud
*Attorney, Agent, or Firm*—Maynard R. Johnson

[57] ABSTRACT

Tetracyclic substituted phthalazine compounds, such as indazolo [1,2-b] phthalazine-6-(11H)-1,3-dione, are prepared by reacting a condensed substituted pyrazolinone with a 2-halomethyl benzoyl halide, or by the reaction of a 2-halobenzoyl halide with phthalazinone to obtain an N-benzoyl-phthalazinone which is then heated with metallic copper to obtain the tetracyclic product. The novel compounds are useful as antiinflammatory, antipyretic and analgesic agents.

9 Claims, No Drawings

TETRACYCLIC SUBSTITUTED PHTHALAZINE COMPOUNDS

CROSS REFERENCE TO RELATED APPLICATION

This is a continuation-in-part of our application Ser. No. 96,625, filed Dec. 9, 1970, and now abandoned.

BACKGROUND OF THE INVENTION

Certain phthalazine compounds are disclosed as pesticides and ultraviolet radiation stabilizers in U.S. Pat. Nos. 2,967,180 and 3,497,512. Certain tetracyclic pthhalazino-phthalazinediones, useful as antiinflammatory agents, are disclosed by Bellasio et al., U.S. Pat. No. 3,557,108.

SUMMARY OF THE INVENTION

This invention relates to tetracyclic phthalazine compounds. More particularly, the substances which form the subject of this invention are tetracyclic substituted phthalazine compounds corresponding to the following formula:

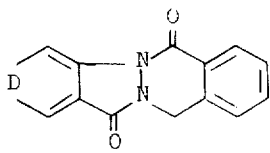  I wherein D is a bivalent radical —CH=Y—, in which Y represents nitrogen or CR, R being selected from hydrogen, lower alkyl, nitro, amino, acylamino, phenylamino, benzylamino, lower alkylamino and di-lower alkylamino radicals. The expression "lower alkyl" includes lower alkyl moieties of from 1, to 2, to 3, to 4 carbon atoms, inclusive, and the expression "acyl" as employed in reference to the above formula refers to aliphatic and aromatic acyl moieties of from 1 to 8 carbon atoms such as formyl, acetyl, propionyl, butyryl, phenacetyl and benzoyl.

The compounds of the invention are crystalline solids which have been found to have a high degree of antiinflammatory activity, antipyretic and analgesic activity, coupled with low toxicity and absence of undesirable side effects on the central nervous system at dosages consistent with pharmacological activity. Thus, they can be administered to animals by conventional routes of administration to alleviate inflammation, pain and fever.

The tetracyclic substituted phthalazine compounds can be prepared by the reaction of contacting a condensed pyrazolinone of the formula II with a 2-halomethyl-benzoyl halide of formula III.

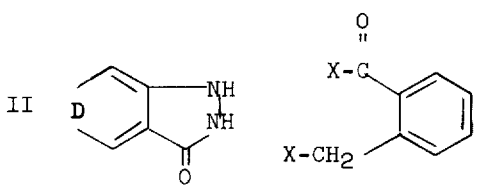

wherein D has the significance set out above and X represents halogen such as chlorine or bromine. The reaction proceeds with the production of hydrohalide of reaction when the reactants are contacted and mixed, typically in the proportions of one molar proportion of the pyrazolinone of formula II to about 1 to about 1.5 molar proportions of the 2-halomethyl benzoyl halide of formula III. The reactants are contacted in a ratio of 1 mole to 1 – 1.5 moles, in the presence of an organic base as a hydrogen halide acceptor at a temperature between room temperature and about 70°C. for from about 2 to about 12 hours, and in the presence of an anhydrous inert organic solvent.

During the course of the reaction, the salt product of the hydrogen halide of reaction and the organic base hydrogen halide acceptor precipitates in the reaction mixture, and is thereafter conveniently separated by filtration. The product can be obtained by conventional procedures such as evaporation or distillation to remove the reaction medium, and can be purified by conventional procedures such as chromatography on silica gel or the like, recrystallization or washing.

Alternatively, the compounds can be prepared by the reaction of a 2-haloaroyl halide of formula IV and a phthalazinone of formula V.

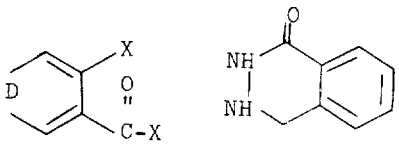

The reaction of 2-haloaroyl halide and the phthalazine proceeds with the production of hydrogen halide of reaction and an N-acylphthalazinone corresponding to formula VI.

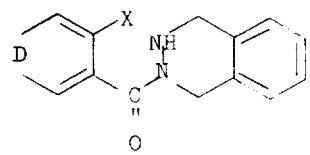 VI

In the above formulae IV, V and VI, D has the significance set out above with respect to formula I and X represents halogen, preferably chlorine or bromine. The N-acylphthalazinone of formula VI is then converted to a compound of formula I by heating the same in the presence of a catalytic amount of metallic copper as a catalyst in an inert organic liquid having a boiling point above 100°C. and in the presence of an organic base hydrogen halide acceptor. The heating is carried out at a temperature of from about 100°C. to the boiling temperature of the reaction mixture.

The reaction of the 2-haloaroyl halide with the phthalazinone proceeds when the reactants are contacted and mixed in the presence of an organic base, such as a tertiary amine, pyridine or a picoline, as a hydrogen halide acceptor and is carried out in an anhydrous inert organic liquid, such as dioxane, as a reaction medium. The reactants are typically employed in substantially equimolar proportions, and are contacted at a temperature between room temperature and the boiling temperature for from about 2 to about 12 hours. The reaction mixture is then filtered to remove the hydrohalide of reaction and the reaction medium is removed by distillation or evaporation to obtain the N-acylphthalazinone intermediate of formula VI. The intermediate can be purified by conventional procedures such as recrystallization or washing, or it can be converted to the tetracyclic product without further purification. In either case, the N-acylphthalazine intermediate is dispersed in an inert organic liquid having a boiling point above 100°C. and the mixture is heated in the presence of an organic base and metallic copper, such as copper powder for from about one to about 10 hours.

The reaction can be carried out in pyridine or one of the picolines, which then will serve both as solvent and as the organic base hydrogen halide acceptor. The reaction mixture is preferably heated at the boiling temperature under reflux for a time sufficient to obtain the desired product, after which the reaction mixture is filtered to remove the copper catalyst. The product can be separated by dilution of the reaction mixture with excess aqueous acid, whereupon the product precipitates, followed by filtration, centrifugation or decantation. The product can be purified by conventional procedures such as by recrystallization and washing.

The selection of the appropriate procedure for preparing any individual compound will depend on the nature of o-halomethylated the starting materials and the desired structure of the end products. In both the above illustrated procedures an o-halogenated or o-halomethtylated six-membered cyclic carboxylic acid acyl halide is used. The acyl halide group of these reactants preferentially will react with the more basic nitrogenated group present in the other reactant, i.e., the NH group not adjacent to the carbonyl group. The orientation of the substituent R or the heterocyclic nitrogen, when present in the grouping D of the generic formula will thus be directed by the correct selection of the two reactants. When a free amino, mono or dialkylamino group, acylamino, phenylamino or benzylamino substituent is desired in the aromatic ring fused with the pyrazole ring of the molecule, it will be desirable, to avoid interfering reactions with the acyl chloride group, to prepare the nitro substituted tetracyclic derivative of formula I wherein Y is CR and R is nitro. Such compound is prepared according to the described processes, and then the nitro compound is converted into the amino and the desired substituted amino group by conventional procedures which are fully familiar to every organic chemist. For example, the nitro substituent can be hydrogenated at atmospheric pressure with a palladium and charcoal catalyst in the presence of acid to obtain the amino compound. The amino compound, corresponding to formula I wherein Y is CR and R is amino, can then be reacted with lower alkyl halides, benzyl or phenyl halides, for example, to obtain the corresponding substituted amino compounds according to classical procedures. Also, if a compound wherein R is acylamino is desired, the compound wherein R is amino can be acylated according to classical acylation procedures for the preparation of amides.

Thus a preferred route for the synthesis of the compounds of the invention comprises reacting an acyl halide corresponding to the formula

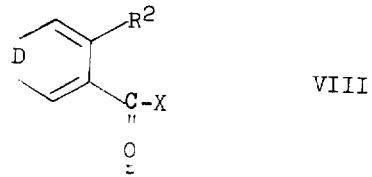

VIII with a heterocyclic compound selected from the group consisting of substituted pyrazolinones corresponding to the formula

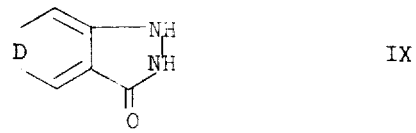

IX and 1,2,3,4-tetrahydrophthalazine-1-one of formula V in the presence of an anhydrous inert organic liquid reaction medium and in the presence of an organic base hydrogen halide acceptor, wherein D represents the divalent radical —CH=Y—, in which Y is nitrogen or CR and in which R represents hydrogen, lower alkyl or nitro; wherein $R^2$ represents halo or halomethyl and wherein X represents halo, with the proviso that when $R^2$ represents halomethyl the acyl halide is a 2-halomethyl benzoyl halide corresponding to formula III and the heterocyclic compound is a substituted pyrazolinone of formula II, with the corresponding proviso that when the heterocyclic compound is a substituted pyrazolinone formula II, the acyl halide is a 2-halomethyl benzoyl halide of formula III; and with the further proviso that when the heterocyclic compound is the 1,2,3,4-tetrahydrophthalazine-1-one of formula V, $R^2$ is halogen, the acyl halide thus being a 2-haloaroylhalide of formula IV. In the latter case the reaction produces the N-acylphthalazinone of formula VI and requires the further step of heating in the presence of the metallic copper catalyst and the organic base hydrogen halide acceptor as described above in order to obtain the tetracyclic product.

Representative compounds of the present invention are listed hereinafter for purposes of illustration. In naming the substances the rules of the I.U.P.A.C. have been followed. For the sake of better understanding it will be useful to note that the basic structure of the compounds having only the two bridge nitrogen atoms, as represented by the following formula

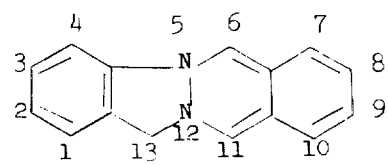

can be named 13H-indazolo[1,2-b]phthalazine. On the other hand, the compounds having both a pyridine and a phthalazine ring fused with the pyrazole ring will receive the name 13H-pyrido[4',3',3,4]pyrazolo[1,2-b]phthalazine or 13H-pipido[3',4',3,4]pyrazolo[1,2-b]phthalazine, depending whether the nitrogen atom in the pyridine ring is present respectively at position 2 or 3 in the above given formula of the basic tetracyclic structure.

Taking into account these rules, typical compounds prepared according to this invention are the following:
Indazolo[1,2-b]phthalazine-6(11H),13-dione;
2-Methylindazolo[1,2-b]phthalazine-6-(11H),13-dione;
3-Methylindazolo[1,2-b]phthalazine-6(11H),13-dione;
2-Ethylindazolo[1,2-b]phthalazine-6(11H),13-dione;

3Ethylindazolo[1,2-b]phthalazine-6(11H),13-dione;
2-Isopropylindazolo[1,2-b]phthalazine-6(11H),13-dione;
3-Isopropylindazolo[1,2-b]phthalazine-6(11H),13-dione;
2-Nitroindazolo[1,2-b]phthalazine-6(11H),13-dione;
3-Nitroindazolo[1,2-b]phthalazine-6(11H),13-dione;
2-Aminoindazolo[1,2-b]phthalazine-6(11H),13-dione;
3-Aminoindazolo[1,2-b]phthalazine-6(11H),13-dione;
2-Acetamidoindazolo[1,2-b]phthalazine-6(11H),13-dione;
3-Acetamidoindazolo[1,2-b]phthalazine-6(11H),13-dione;
2-Propionamidoindazolo[1,2-b]phthalazine-6(11H),13-dione;
3-Propionamidoindazolo[1,2-b]phthalazine-6(11H),13-dione;
2-Benzamidoindazolo[1,2-b]phthalazine-6(11H),13-dione;
3-Benzamidoindazolo[1,2-b]phthalazine-6(11H),13-dione;
2Formamidoindazolo[1,2-b]phthalazine-6(11H),13-dione;
3-Formamidoindazolo[1,2-b]phthalazine-6(11H),13-dione;
2-Dimethylaminoindazolo[1,2-b]phthalazine-6(11H),13-dione;
3-Dimethylaminoindazolo[1,2-b]phthalazine-6(11H),13-dione;
2-Diethylaminoindazolo[1,2-b]phthalazine-6(11H),13-dione;
3-Diethylaminoindazolo[1,2-b]phthalazine-6(11H),13-dione;
2-Benzylaminoindazolo[1,2-b]phthalazine-6(11H),13-dione;
3-Benzylaminoindazolo[1,2-b]phthalazine-6(11H),13-dione;
Pyrido[4',3',3,4]pyrazolo[1,2-b]phthalazine-6(11H),13-dione; and
Pyrido[3',4',3,4]pyrazolo[1,2-b]phthalazine-6(11H),13-dione.

DESCRIPTION OF PREFERRED EMBODIMENTS

For a more complete understanding of the invention the following examples are given by way of illustration.

EXAMPLE 1

Indazolo[1,2-b]phthalazine-6(11H),13-dione

A. 50 Grams of 2-bromomethybenzoyl chloride in 120 milliliters of dioxane are added gradually to 19.15 grams of 3-indazoline-2-one in 1500 milliliters of dioxane. The addition is carried out after a period of about 1.5 hours at a temperature of 40°C. Thereafter, 43.3 grams of triethylamine in 100 milliliters of dioxane are added to the mixture in about 1.5 hours at 40°C. After stirring for an additional 2 hours at the same temperature the mixture is filtered. The filtrate is evaporated to dryness in vacuo. The evaporation residue is dissolved in 1000 milliliters of chloroform, and the solution is washed with dilute hydrochloric acid and with water. After drying over calcium chloride, the chloroform is distilled off. The indazolo[1,2-b]phthalazine-6(11H),13-dione product is obtained as a residue. The product is dissolved in benzene and purified by chromatography on a silica gel column, using a benzene-acetone mixture for elution. The product is recrystalized from methanol and found to melt at a temperature of 189°–191°C. 19.5 Grams of product are obtained, representing a yield of 55 percent of the calculated yield based on the amount of starting material employed.

B. 22.7 Grams of 2-bromobenzoyl chloride in 230 milliliters of chloroform are added gradually to 15.35 grams of 1,2,3,4-tetrahydrophthalazine-1-one and 10.65 grams of triethylamine in 230 milliliters of chloroform, over a period of 30 minutes. The mixture is maintained at a temperature of 10°C. during the addition. The resulting mixture is heated at the boiling temperature under reflux for 1.5 hours, after which it is cooled and filtered. The filtrate is washed with water and evaporated to dryness in vacuo. 26.6 Grams of 3-(2-bromobenzoyl)-1,2,3,4-tetrahydrophthalazine-1-one, are obtained, which is found to melt at 188°–190°C. After recrystallization from benzene, twenty grams of the 3-(2-bromobenzoyl)-1,2,3,4-tetrahydrophthalazine-1-one is mixed with 8 grams of copper powder and 250 milliliters of 4-picoline. The mixture is heated at the boiling temperature under reflux for 7 hours. The mixture is filtered to remove the copper and the filtrate is poured into 1000 milliliters of water and 300 milliliters of concentrated hydrochloric acid. The resulting precipitate is collected, washed with water and recrystallized from methanol to provide 12 grams (79.5 percent yield) of the indazolo[1,2-b]phthalazine-6(11H),13-dione product, melting at 189°–191°C.

EXAMPLE 2

2-Methylindazolo[1,2-b]phthalazine-6(11H),13-dione 48.7 Grams of 2-bromomethylbenzoyl chloride in 120 milliliters of dioxane are added to 20.6 grams of 5-methylindazoline-3-one in 2000 milliliters of dioxane, in about 2 hours at 45°C. 42.5 Grams of triethylamine in 100 milliliters of dioxane are then added to the mixture in about 1 hour at 45°C. After stirring for 2 hours the mixture is filtered. The filtrate is evaporated to dryness in vacuo, and the residue is dissolved in 700 milliliters of chloroform, washed with dilute hydrochloric acid and water, dried over calcium chloride and evaporated to dryness in vacuo. The 2-methylindazolo[1,2-b]phthalazine-6(11H),13-dione product is obtained as a residue. The residue is dissolved in benzene and chromatographed through silica gel eluting with a benzene acetone mixture. The product is recrystallized from methanol and found to melt at 191°–192°C. 21.2 Grams of the named product are obtained (66.8 percent yield).

EXAMPLE 3

Pyrido[4',3',3,4]pyrazolo[1,2-b]phthalazine-6(11H),13-dione

A solution of 21.75 grams of 2-bromomethylbenzoyl chloride in 150 milliliters of dioxane is added at a temperature of 50°C. in 20 minutes to 9 grams of 1H-pyrazolo-[4,3-c]pyridine-3(2H)-one of the formula:

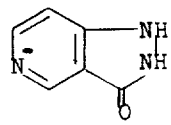

and 12 grams of trimethylamine in 1300 milliliters of dioxane. The mixture is stirred at 50°C. for 1 hour and then at 80°C. for 6 hours. After cooling the mixture is filtered and the filtrate is evaporated to dryness in vacuo. The evaporation residue, containing the pyrido-[4',3'3,4]pyrazolo[1,2-b]phthalazine-6(11H),13-dione product, is purified by chromatography through silica gel and elution with a chloroform-benzene mixture. The purified product is found to melt at 222°–223°C. 11.8 Grams of the named product are obtained (70 percent yield).

EXAMPLE 4

3-Nitroindazolo[1,2-b]phthalazine-6(11H),13-dione

In a procedure similar to that of Example 1, 37.2 grams of 2-chloromethylbenzoyl chloride in 120 milliliters of dioxane are added to 23.5 grams of 6-nitroindazoline-3-one in 2000 milliliters of dioxane at 40°C. in about 2 hours, followed by 40 grams of triethylamine in 100 milliliters of dioxane. Stirring at 40°C. is continued for 2.5 hours, then the mixture is cooled and filtered and the filtrate is evaporated to dryness in vacuo. The 3-nitroindazolo-[1,2-b]phthalazine-6(11H),13-dione product obtained as an evaporation residue is recrystallized from chloroform, and found to melt at 255°–257°C.

EXAMPLE 5

3-Aminoindazolo[1,2-b]phthalazine-6(11H),13-dione

A mixture of 3.4 grams of 3-nitroindazolo[1,2-b]phthalazine-6(11H),13-dione, 1.2 grams of 10 percent palladium on charcoal, 115 milliliters of water, 230 milliliters of acetic acid and 13.6 milliliters of Normal hydrochloric acid is hydrogenated with hydrogen at atmospheric pressure and room temperature until hydrogen absorption subsides. The palladium-charcoal catalyst is filtered off and the filtrate is evaporated to dryness in vacuo. The residue is shaken for 30 minutes with aqueous saturated sodium bicarbonate solution, collected, washed with water and recrystallized from butanol to provide 2.12 grams of 3-aminoindazolo[1,2-b]phthalazine-6(11H),13-dione. The named product is found to melt at a temperature of 303°C., (sintering at 337°–342°C.)

EXAMPLE 6

2-Nitroindazolo[1,2-b]phthalazine-6(11H),13-dione

To 67 grams of 1,2,3,4-tetrahydrophthalazine-1-one in 3600 milliliters of chloroform, 49.8 grams of 2-chloro-5-nitrobenzoyl chloride in 450 milliliters of chloroform are added at 0°C. under stirring. The resulting mixture is stirred at 40°C. for 2.5 hours. The mixture is filtered and the filtrate is evaporated to dryness in vacuo giving 59 grams of 3-(2-chloro-5-nitrobenzoyl)-1,2,3,4-tetrahydrophthalazine-1-one, melting at 225°–227°C., as a residue. A mixture of 24.7 grams of the above named intermediate, 9.9 grams of copper powder and 300 milliliters of pyridine is heated at the boiling temperature under reflux for 2 hours. The copper catalyst is then filtered off and the filtrate is concentrated in vacuo to a volume of about 200 milliliters. The mixture is poured into 800 milliliters of water and 200 milliliters of concentrated hydrochloric acid with external cooling. The 2-nitroindazolo[1,2-b]phthalazine-6(11H),13-dione product precipitates in the mixture. The product is collected, washed with water and recrystallized from dilute acetic acid and found to melt at 321°–323°C. 15.3 Grams of the named product are obtained.

EXAMPLE 7

2-Aminoindazolo[1,2-b]phthalazine-6(11H),13-dione

A mixture of 9.8 grams of 2-nitroindazolo[1,2-b]phthalazine-6(11H),13-dione, 3.3 grams of 10 percent palladium on charcoal, 290 milliliters of water, 820 milliliters of acetic acid and 42 milliliters of Normal hydrochloric acid is hydrogenated at atmospheric pressure and room temperature until hydrogen absorption subsides. The palladium-charcoal catalyst is filtered off and the filtrate is evaporated to dryness in vacuo. The residue is washed with aqueous saturated sodium bicarbonate solution, then with water. The 2-aminoindazolo[1,2-b]phthalazine-6(11H),13-dione product is recrystallized from dilute acetic acid and found to melt at 228°–230°C. 5.83 Grams (66.3 percent yield) of the named product are obtained.

EXAMPLE 8

2-Acetamidoindazolo[1,2-b]phthalazine-6(11H),13-dione

The compound obtained in Example 7 is acetylated with excess acetic anhydride in pyridine according to conventional procedures for acetylation. The 2-acetamidoindazolo[1,2-b]phthalazine-6(11H),13-dione product is found to melt at 355°–357°C.

EXAMPLE 9

2-Formamidoindazolo[1,2-phthalazine-6(11H),13-dione

The compound obtained in Example 7 is formylated with excess aqueous formic acid according to usual procedures. The 2-formamidoindazolo[1,2-b]phthalazine-6(11H),13-dione product is found to melt at 285°–290°C.

EXAMPLE 10

2-Dimethylaminodazolo[1,2-b]phthalazine-6(11H),13-dione

To a mixture of 6.4 grams of 2-formamidoindazolo[1,2-b]phthalazine-6(11H),13-dione and 107 milliliters of aqueous 90 percent formic acid, heated to 100°C., 9.6 milliliters of aqueous 40 percent formaldehyde are added in 15 minutes. After 3 hours at 100°C. the mixture is evaporated to dryness in vacuo and the residue is treated with aqueous saturated sodium bicarbonate solution. The resulting precipitated 2-dimethylaminoindazolo[1,2-b]phthalazine-6(11H),13-dione product is collected, washed with water and purified by chromatography through silica gel eluting with 2 percent chloroform methanol. The product is found to melt at 247°–250°C. 4.6 Grams of the named product are obtained (72 percent yield).

The compounds of the invention can be employed as antiinflammatory agents in alleviating inflammation and edema in animals. They can also be employed as antipyretic agents to alleviate fever, and as analgesics to alleviate pain. In general, their antiinflammatory activity is superior to that of acetylsalicylic acid (aspirin), while they share the analgesic and antipyretic activity of aspirin. This is in contrast to the antiinflammatory phthalazines of Bellasio et al. U.S. Pat. No. 3,557,108, which exhibit little or no significant antipyretic or analgestic properties.

In representative operations, the antiinflammatory activity of the compounds of the above Examples was evaluated by the carrageenin and the granuloma pellets test on rats.

In representative operations, the antiinflammatory activity of the compounds of the above Examples was evaluated by the carrageenin and the granuloma pellets test on rats. The animals were orally administered a single compound at a dose which ranged from 50 to 100 milligrams of compound per kilogram of animal body weight. This amount corresponds to about one-twentieth to one-fifth of the $LD_{50}$. In such operations the compounds displayed a good antiinflammatory and antiedematous response, with some of the active compounds are exhibiting antiinflammatory properties at a dosage of one-twentieth of their $LD_{50}$ while at a dose which corresponds to one-fifth of the $LD_{50}$ the decrease of edema is of about 40–50 percent. The compounds are also active on adrenalectomized animals.

In other operations, the compounds of Examples 1, 3 and 7 were evaluated for oral antipyretic and analgesic activity in rats, and compared to a dosage of 100 milligrams of acetylsalicylic acid per kilogram as a standard. In such operations, the method of Buller et al., J Pharm. Pharmacol., 9, 128 (1957), was employed for antipyretic operations, and a method similar to the method of Randall and Seliho, Arch. Int. Pharmacodyn., 111, 409 (1957), was employed to evaluate analgesia. The prior art compound, phthalazino(2,3-b) phthalazine-5(14H), 12(7H)-dione, was also included as a test compound. The antipyretic and analgesic activity observed in these operations was expressed in terms of potency relative to the acetylsalicylic acid standard, on a numerical scale in which zero represents no observed activity and one represents potency equivalent to the standard. The results are set out below.

| Test Compound | Anti-pyresis | Analgesia |
|---|---|---|
| Indazolo(1,2-b)phthalazine-6(11H)-13-dione | 0.4 | 0.3 |
| 2-Aminoindazolo(1,2-b)phthalazine-6(11H),13-dione | 3.3 | 0.6 |
| Pyrido(4',3',3,4)pyrazolo(1,2b)phthalazine-6(11H),13-dione | 0.3 | 0.6 |
| Phthalazino(2,3-b)phthalazine-5(14H),12(7H)-dione | 0.04 | 0 |

Although the usual administration route is by mouth, the compounds can be administered by parenteral routes. In this latter case the compounds may be dissolved in a parenterally acceptable solvent such as, for instance, propylene glycol or a mixture of propylene glycol and pryogen free distilled water. When the oral route is employed the drugs are preferably admixed with excipients such as starches, gums, sugars, fatty acids, and the like and then compounded in tablets or capsules.

What is claimed is:

1. A compound of the formula

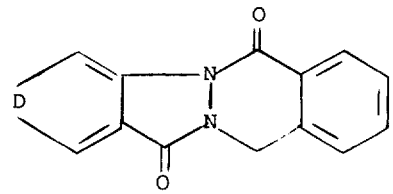

wherein D represents a divalent radical —CH=Y—, in which Y is nitrogen or CR, and in which R is selected from hydrogen, lower alkyl of from 1 to 4 atoms, nitro, amino, acylamino in which the acyl moiety is formyl, acetyl, propionyl, butyryl, phenacetyl or benzoyl, phenylamino, benzylamino, and lower alkylamino or di-lower alkylamino in which the lower alkyl moieties have from 1 4 carbon atoms.

2. A compound of claim 1 wherein Y is nitrogen.

3. A compound of claim 2 wherein Y is CR and R is nitro.

4. A compound of claim 2 wherein Y is CR and R is amino.

5. A compound of claim 2 wherein Y is CR and R is hydrogen.

6. A compound of claim 2 wherein the compound is 2-aminoindazolo[1,2-b]phthalazine-6(11H),13-dione.

7. A compound of claim 2 wherein the compound is pyrido[4',3',3,4]pyrazolo[1,2-b]phthalazine-6(11H),13-dione.

8. A compound of claim 2 wherein the compound is 2-nitroindazolo[1,2-b]phthalazine-6(11H),13-dione.

9. A compound of the formula

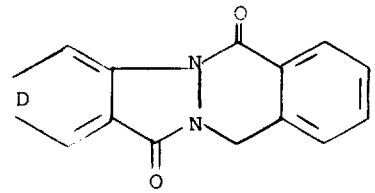

wherein D represents a divalent radical —CH=Y—, in which Y is nitrogen or CR, and in which R is selected from hydrogen, methyl, nitro, amino, formamido, acetamido or dimethylamino.

* * * * *